(12) United States Patent
Nobbe et al.

(10) Patent No.: US 12,267,146 B2
(45) Date of Patent: *Apr. 1, 2025

(54) RADIO FREQUENCY DATA DOWNLINK FOR A HIGH REVISIT RATE, NEAR EARTH ORBIT SATELLITE SYSTEM

(71) Applicant: Skeyeon, Inc., San Diego, CA (US)

(72) Inventors: Dan Nobbe, San Diego, CA (US); Ronald E. Reedy, San Diego, CA (US)

(73) Assignee: Skeyeon, Inc., San Diego, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 18/205,611

(22) Filed: Jun. 5, 2023

(65) Prior Publication Data

US 2023/0327749 A1    Oct. 12, 2023

Related U.S. Application Data

(63) Continuation of application No. 16/925,081, filed on Jul. 9, 2020, now Pat. No. 11,671,169, which is a
(Continued)

(51) Int. Cl.
*H04W 84/06* (2009.01)
*G01S 19/25* (2010.01)
(Continued)

(52) U.S. Cl.
CPC ........ *H04B 7/18513* (2013.01); *G01S 19/254* (2013.01); *H04B 7/18534* (2013.01); *H04W 84/06* (2013.01); *G01S 13/88* (2013.01)

(58) Field of Classification Search
CPC ............... H04W 84/06; H04B 7/18513; H04B 7/18534; G01S 19/254
(Continued)

(56) References Cited

U.S. PATENT DOCUMENTS

| 4,754,601 A | 7/1988 | Minovitch |
| 5,433,726 A | 7/1995 | Horstein et al. |

(Continued)

FOREIGN PATENT DOCUMENTS

| EP | 0668212 | 8/1995 |
| EP | 2853737 | 4/2015 |

(Continued)

OTHER PUBLICATIONS

Patent Cooperation Treaty, Notification of Transmittal of the International Search Report and the Written Opinion of the International Searching Authority, or the Declaration, Application No. PCT/US2019/013149, mailed Jan. 11, 2019, 21 pages.
(Continued)

*Primary Examiner* — Joel Ajayi
(74) *Attorney, Agent, or Firm* — McAndrews, Held & Malloy, Ltd.

(57) ABSTRACT

A satellite system operates at altitudes between 100 and 350 km relying on vehicles including a self-sustaining ion engine to counteract atmospheric drag to maintain near-constant orbit dynamics. The system operates at altitudes that are substantially lower than traditional satellites, reducing size, weight and cost of the vehicles and their constituent subsystems such as optical imagers, radars, and radio links. The system can include a large number of lower cost, mass, and altitude vehicles, enabling revisit times substantially shorter than previous satellite systems. The vehicles spend their orbit at low altitude, high atmospheric density conditions that have heretofore been virtually impossible to consider for stable orbits. Short revisit times at low altitudes enable near-real time imaging at high resolution and low cost. At such altitudes, the system has no impact on space junk issues of traditional LEO orbits, and is self-cleaning in that space junk or disabled craft will de-orbit.

19 Claims, 5 Drawing Sheets

Related U.S. Application Data continuation of application No. 15/868,812, filed on Jan. 11, 2018, now Pat. No. 10,715,245, which is a continuation-in-part of application No. 15/439,533, filed on Feb. 22, 2017, now Pat. No. 10,351,267.

(60) Provisional application No. 62/430,727, filed on Dec. 6, 2016.

(51) Int. Cl.
    *H04B 7/185* (2006.01)
    *G01S 13/88* (2006.01)

(58) Field of Classification Search
    USPC ........................................................ 455/427
    See application file for complete search history.

(56) References Cited

U.S. PATENT DOCUMENTS

| | | |
|---|---|---|
| 5,867,124 A | 2/1999 | Sointula |
| 6,064,858 A | 5/2000 | Maatman et al. |
| 6,145,298 A | 11/2000 | Burton, Jr. |
| 6,834,492 B2 | 12/2004 | Hruby et al. |
| 6,850,497 B1 | 2/2005 | Sigler |
| 7,270,300 B2 | 9/2007 | Dressler |
| 7,306,189 B2 | 12/2007 | Dressler |
| 7,581,380 B2 | 9/2009 | Wahl |
| 8,312,704 B2 | 11/2012 | Keady |
| 8,723,422 B2 | 5/2014 | Diamant et al. |
| 8,800,932 B2 | 8/2014 | Liu et al. |
| 9,657,725 B2 | 5/2017 | Berl |
| 9,723,386 B1 | 8/2017 | Ni et al. |
| 9,796,487 B2 | 10/2017 | Yi et al. |
| 2002/0041328 A1 | 4/2002 | Lecompte et al. |
| 2003/0046921 A1 | 3/2003 | Hruby et al. |
| 2004/0245407 A1 | 12/2004 | D'Ausilio et al. |
| 2005/0060092 A1 | 3/2005 | Hablani |
| 2005/0178919 A1 | 8/2005 | Dressler |
| 2006/0030311 A1 | 2/2006 | Cruz et al. |
| 2008/0237399 A1 | 10/2008 | Caplin et al. |
| 2009/0251773 A1 | 10/2009 | Danziger et al. |
| 2010/0045512 A1 | 2/2010 | Nelson |
| 2010/0155524 A1 | 6/2010 | Maganas |
| 2011/0192284 A1 | 8/2011 | Sawyer et al. |
| 2012/0062100 A1 | 3/2012 | Liu et al. |
| 2012/0193015 A1 | 8/2012 | Segal et al. |
| 2012/0217348 A1 | 8/2012 | Martinez |
| 2012/0307720 A1 | 12/2012 | Madsen et al. |
| 2013/0102240 A1 | 4/2013 | Helfers |
| 2015/0131703 A1 | 5/2015 | Balter |
| 2015/0228471 A1 | 8/2015 | Shimoi et al. |
| 2016/0094288 A1 | 3/2016 | Krebs |
| 2017/0070939 A1 | 3/2017 | Chong et al. |
| 2017/0192095 A1 | 7/2017 | Jobanputra et al. |

FOREIGN PATENT DOCUMENTS

| | | |
|---|---|---|
| GB | 1181158 | 2/1970 |
| WO | 2017127844 | 7/2017 |

OTHER PUBLICATIONS

Patent Cooperation Treaty, Notification of Transmittal of the International Search Report and the Written Opinion of the International Searching Authority, or the Declaration, Application No. PCT/US2017/064712, mailed Jul. 23, 2018 (17 pages).

Aerospace America, published monthly by the American Institute of Aeronautics and Astronautics, Inc., Jan. 2015, vol. 53, No. 1, 68 pages.

Gravity Field and Steady-State Ocean Circulation Explorer; Wikipedia, the free encyclopedia; Retrieved from "http://en.wikipedia.org/w/index.php?title=Gravity_Field_and_Steady-State_Ocean_Circulation_Explorer&oldid=660976463"; Last updated May 5, 2015, 7 pages.

Natalia Mironova, African Farmers to Get NASA, NOAA Data on Their Phones (p. 6); Marc Selinger, A Stitch in Time for NASA Airplane Techies (p. 7); Marc Selinger, Satellite Pushed by Former VP Gore Ready for Launch (p. 8); Mark Williamson, Atmospheric Skimming Satellites (p. 9); Aerospace America; Jan. 2015, pp. 6-9; 4 pages.

Lake A. Singh; Very Low Earth Orbit Propellant Collection Feasibility Assessment; A Dissertation Presented to The Academic Faculty; Georgia Institute of Technology; Dec. 2014; 225 pages.

D. Di Cara, J. Gonzalez Del Amo, A. Santovicenzo, B. Carnicero Dominguez, M. Arcioni and A. Caldwell, I. Roma; Ram Electric Propulsion for Low Earth Orbit Operation: an ESA Study; IEPC-2007-162; Presented at The 30th International Electric Propulsion Conference, Florence, Italy, Sep. 17-20, 2007; 8 pages.

Tony Schonherr, Kimiya Komurasaki, Francesco Romano, Bartomeu Massuti-Ballester, and Georg Herdich; Analysis of Atmosphere-Breathing Electric Propulsion; IEEE Transactions on Plasma Science, vol. 43, No. 1, Jan. 2015, 8 pages.

D. Di Cara, J. Gonzalez del Amo, A. Santovincenzo, B. Carnicero Dominguez, M. Archioni, and A. Caldwell, and I. Roma; Ram Electric Propulsion for Low Earth Orbit Operation: an ESA study; IEPC-2007-162; Presented at the 30th International Electric Propulsion Conference, Florence, Italy; Sep. 17-20, 2007, 8 pages.

G. Cifali, T. Misuri, P. Rossetti, M. Andrenucci, D. Valentian, and D. Feili; Preliminary characterization test of HET and RIT with Nitrogen and Oxygen; 47th AIAA/ASME/SAE/ASEE Joint Propulsion Conference & Exhibit; Jul. 31-Aug. 3, 2011, San Diego, California; AIAA 2011-6073; 16 pages.

Kazutaka Nishiyama; Air Breathing Ion engine Concept; 54th International Astronautical Congress of the International Astronautical Federation, the International Academy of Astronautics, and the International Institute of Space Law; Sep. 29-Oct. 3, 2003, Bremen, Germany; IAC-03-S.4.02; 8 pages.

Kazutaka Nishiyama, Hitoshi Kuninaka, Yukio Shimizu, Kyoichiro Toki; 30mN-Class Microwave Discharge Ion Thruster, Institute of Space and Astronautical Science, IEPC 2003-62, 10 pages.

H.W. Loeb, G.A. Popov, V.A. Obukhov, D. Feili, CH. Collingwood, and A. Mogulkin; Large Radio Frequency Ion Engines, Электронный журнал «Труды МАИ». Выпуск No 60—Russian translation: "Electronic journal "Proceedings of the MAI." Issue No. 60" 8 pages.

Kevin D. Diamant; A 2-Stage Cylindrical Hall Thruster for Air Breathing Electric Propulsion; 46th AIAA/ASME/SAE/ASEE Joint Propulsion Conference & Exhibit; Jul. 25-28, 2010, Nashville, TN; AIAA 2010-6522; 9 pages.

Kevin D. Diamant; Microwave Cathode for Air Breathing Electric Propulsion; Presented at the 31st International Electric Propulsion Conference, University of Michigan, Ann Arbor, Michigan, USA; Sep. 20-24, 2009; EPC-2009-015; 11 pages.

Kazuhisa Fujita; Air Intake Performance of Air Breathing Ion Engines; vol. 52, No. 610, pp. 514-521, 2004; 8 pages.

Leonid Pekker and Michael Keidar; Analysis of Airbreathing Hall-Effect Thrusters; Journal of Propulsion and Power; vol. 28, No. 6, Nov.-Dec. 2012; 7 pages.

Thomas John McGuire; Aero-Assisted Orbital Transfer Vehicles Utilizing Atmosphere Ingestion; Thesis submitted to the Department of Aeronautics and Astronautics; Jun. 8, 2001, 133 pages.

L. Garrigues; Computational Study of Hall-Effect Thruster with Ambient Atmospheric Gas as Propellant; Journal of Propulsion and Power; vol. 28, No. 2, Mar.-Apr. 2012; 11 pages.

Angelo Cervone, Barry Zandbergen, Jian Guo, Eberhard Gill, Wolter Wieling, Flavia Tata Nardini, and Coen Schuurbiers; Application of an Advanced Micro-Propulsion System to the Delffi Formation-lying Demonstration Within the QB50 Mission; 63rd International Astronautical Congress, Naples, Italy. Copyright © 2012 by the International Astronautical Federation; IAC-12-C4.6.2; 8 pages.

Patent Cooperation Treaty, Notification of Transmittal of the International Search Report and the Written Opinion of the International Searching Authority, or the Declaration, Application No. PCT/US2019/013153, mailed May 13, 2019, 17 pages.

RADIO FREQUENCY DATA DOWNLINK FOR A HIGH REVISIT RATE, NEAR EARTH ORBIT SATELLITE SYSTEM

CROSS REFERENCE TO RELATED APPLICATIONS

This application is a continuation of U.S. patent application Ser. No. 16/925,081, filed Jul. 9, 2020, which is a continuation of U.S. patent application Ser. No. 15/868,812, filed Jan. 11, 2018 (U.S. Pat. No. 10,715,245), entitled "Radio Frequency Data Downlink For A High Revisit Rate, Near Earth Orbit Satellite System". This application also claims priority to U.S. Provisional Patent Application Ser. No. 62/430,727, filed Dec. 6, 2016, entitled "A Satellite System" and U.S. patent application Ser. No. 15/439,533 filed on Feb. 22, 2017 (U.S. Pat. No. 10,351,267), entitled "A Satellite System". The entirety of U.S. patent application Ser. No. 15/868,812, U.S. Provisional Patent Application Ser. No. 62/430,727 and U.S. patent application Ser. No. 15/439,533 are incorporated herein by reference.

BACKGROUND

Satellites are used in many aspects of modern life, including earth observation and reconnaissance, telecommunications, navigation (e.g., global positions systems, or "GPS"), environmental measurements and monitoring and many other functions. A key advantage of satellites is that they remain in orbit due to their high velocity that creates an outward centripetal force equal to gravity's inward force. Therefore, once in orbit, they stay there typically for years or decades. See, for example, FIG. 8, which graphically illustrates a best and worst case curve for expected lifetime of orbiting vehicles as a function of altitude. Depending on the angle of the orbit, a satellite will be able to observe a large fraction of the earth's surface at some point in time.

A key parameter for satellites used for earth observation is the relationship between altitude, orbital angle, and constellation size. At higher altitudes, the satellite will be able to observe a larger percentage of the earth's surface, however the orbital time will be longer and the instrument package required to effectively cover a larger area at a longer range will be larger and more complex, on the other hand, a longer orbital time means that the satellite will appear to be in view of a given point on the earth for a longer period and the number of satellites required to keep all of the earth in view all of the time decreases. In order for one satellite to cover the entire surface of the earth, sun synchronous polar orbits are frequently used.

Satellite orbital heights are typically categorized in three broad segments: low earth orbit (LEO), medium earth orbit (MEO) and geostationary earth orbit (GEO). The general uses and characteristics of these orbits are shown in Table I and represent generally accepted usage of the terms LEO, MEO and GEO. Satellites can orbit at any altitude above the atmosphere, and the gaps in altitude shown in Table 1, such as between LEO and MEO, are also used, if less regularly. It is also common that satellites may orbit in eccentric, non-circular orbits, thereby passing through a range of altitudes in a given orbit.

TABLE I

Typical characteristics of common orbits.

| | | | | |
|---|---|---|---|---|
| LEO | 400-2,000 | 6.9-7.8 | Earth observation, sensing, ISS, telecom constellations | Random orbits, 3-10 Y lifetime, space junk issue, little radiation |
| MEO | 15,000-20,000 | 3.5 | GPS, GLONASS, Earth observation | Highest radiation (Van Allen Belt), equatorial to polar orbits |
| GEO | 42,000 | 3.1 | Sat TV, high BW telecom, weather satellites | Can remain above same spot on Earth, typically equatorial orbits |

For imaging, the power requirements of the digital optical package and downlink grows roughly in accordance with a square law for the same delivered image resolution. GEO satellites are far too high for a practical optical observation package. LEO, on the other hand, allows for reasonable optical size and power and is protected from space radiation. Most earth imaging satellites operate at lower altitudes, roughly at the altitude of the international space station (ISS) (400 km) or higher, up to about 2,000 km. At these altitudes, the size and power requirements of the imaging package are much lower for the same resolution relative to a geostationary orbit, the earth's magnetic field shields the satellite from most damaging space radiation, and the atmosphere is sufficiently thin that orbital decay is not a major problem. However, the satellite will only be in view of a given section of the earth's surface for a few minutes, and at lower altitudes, line of sight communication may only be possible for a minute or less. This requires a large constellation satellites or accepting a lower "revisit" rate for a given point on the Earth's surface.

Altitudes lower than the international space station (ISS) have the advantage that the imaging package can again, be substantially reduced in size, weight, and power consumption, which in theory allows for much lower cost satellites. However, atmospheric drag becomes a major consideration for orbits below the orbit of the ISS—even the ISS requires regular "boosting" to keep its orbit from decaying rapidly, and orbital decay issues grow exponentially below ISS altitudes. The assignee of the present invention has addressed this issue with a novel low drag orbital vehicle and constellation design described in co-pending application with Ser. No. 15/868,794, entitled "System For Producing Remote Sensing Data From Near Earth Orbit," to Thomas E. Schwartzentruber and Ronald E. Reedy, and co-pending application with Ser. No. 62/616,325, entitled "Atomic Oxygen-Resistant, Low Drag Coatings And Materials," to Timothy Minton and Thomas E. Schwartzentruber. This enables Near Earth Orbiters, NEOs, a term we use to describe the system and its constituent vehicles (i.e., a "NEO satellite system", "NEO vehicle" or a "NEO satellite") operating in stable orbits at 100-350 km. Therefore, it is a purpose of this invention to describe a satellite system based on orbital vehicles operating in stable Earth orbits at altitudes well below traditional satellites, specifically between approximately 100 and 300 km.

The availability of a low drag, low cost, high endurance (multi-year missions) satellite suitable for altitudes under 300 km allows for the use of imaging equipment that is low cost and low power yet achieves resolutions that are currently only available from much more expensive, higher altitude satellites and much higher revisit rates because the constellation can be large for the same cost. There remains, however, the problem of retrieving the high revisit rate, high-resolution data collected by a large constellation of NEO satellites. Smaller constellations at higher orbits solve this problem either because the downlinks are relatively lower data rates per downlink (voice calls), or using very high bandwidth, but expensive earth stations. Higher orbits also imply long revisit times—for a single satellite, the revisit time may be measured in days. At sub 300 km orbits, the orbital window for a downlink to a given station is too small to tolerate a small number of earth stations with the power available in a small satellite. Furthermore, in order to fully take advantage of the high revisit rates possible in a large NEO constellation, the downlink must be sufficiently robust to allow for near real time download of data, with latency on the order of seconds or at most, a few minutes. In the event that a downlink is not immediately available, the processor can buffer the captured data for later transmission when a receiving station is within range.

Consequently, the ground station network must in some respects mirror the satellite network, with a large number of ground stations to ensure that a given satellite can be continuously pushing its image data down. Achieving low power consumption for a given bandwidth is also essential, since the small satellite profile required to achieve a low per satellite cost has a correspondingly small surface area available for solar panels to generate power for the downlink and antennas to provide the antenna gain.

The combination of these factors means that there is a need for a low cost, low power, high data rate satellite downlink system that meets the mission payload requirements for a small orbital vehicle under 300 km that still has a camera resolution on the order of 1 meter, coupled with a corresponding robust network of ground stations to match the capacity of the satellites and reduce the delay time in retrieving a high resolution image of a given point on the earth to sub one hour times.

SUMMARY

In one example, a downlink is described that operates in the Ku band and works with a satellite network of imaging devices with a roughly 1 meter resolution imaging 240 square km per second.

In another example, a downlink is described that operates with an earth network that uses approximately 70 earth stations to cover the continental United States and to provide continuous downlink coverage within that area.

Figure 1:
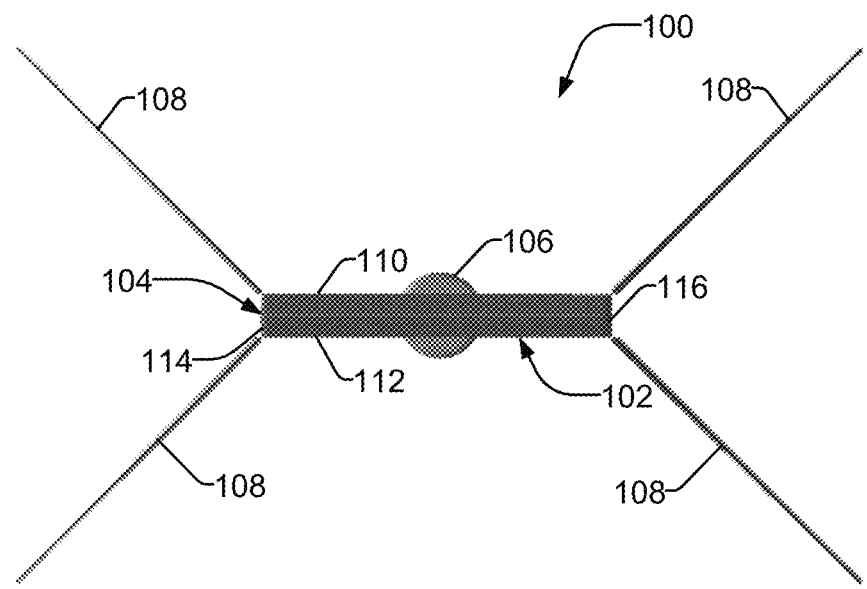
FIG. 1 shows an example overall design of a low profile satellite used with the present invention.

The several figures provided here describe examples in accordance with aspects of this disclosure. The figures are representative of examples, and are not exhaustive of the possible embodiments or full extent of the capabilities of the concepts described herein. Where practicable and to enhance clarity, reference numerals are used in the several figures to represent the same features.

DETAILED DESCRIPTION

This detailed embodiment is exemplary and not intended to restrict the invention to the details of the description. A person of ordinary skill will recognize that exemplary numerical values, shapes, altitudes, applications of any parameter or feature are used for the sole purpose of describing the invention and are not intended to be, nor should they be interpreted to be, limiting or restrictive.

The presented embodiments provide digital, optical imaging systems as well as other imaging schemes, such as synthetic aperture radar (SAR) and/or thermal imagers. Each system is equally suitable, as long as associated imaging equipment acquires and generates data at an acquisition and transmission rate comparable with the contemplated invention to and from a comparable altitude.

A constellation of NEO imaging orbiters is placed in orbits at an altitude of about 260 km. The vehicles are equipped with digital imaging optics that will resolve features down to 1 meter in size across a 30 km wide imaged swath, with an orbital velocity of roughly 8 km/second. At this altitude, the useful amount of time that a given satellite is overhead is about one minute, and if there is no overlap, a single swath will scan across the equator in about 1350 orbits. The circumference of the earth is 40,075 km, so 30 km swaths result in a single satellite being in view of a given portion of the earth about once every 1900 hours or 80 days at the equator. These times improve towards the poles, so at mid latitudes the revisit rate is substantially higher. Even so, to achieve sub one hour revisit rates for the middle latitudes (North America in particular) requires a very large number of satellites, and the present system is designed to work with a large constellation, from 100 to over a 1000 satellites. The constellation is easily scaled, such that increasing the number of satellites to 10,000 can be achieved.

A large satellite at 260 km will experience considerable drag, which requires a large amount of propellant to keep in orbit, further increasing the size of the vehicle. Accordingly, a 260 km satellite must be small and present a low drag profile, such as that disclosed in the related application entitled "System For Producing Remote Sensing Data From Near Earth Orbit." However, the small size means limited surface area for solar panels, which results in lower available power for the radio downlink, which in the present embodiment must operate in near real time. Accordingly, the present invention is designed for a power budget of 30 watts.

FIG. 1 illustrates an exemplary version of a NEO vehicle 100. The vehicle is a low drag, "pizza box" design with a wedged leading edge and solar panels deployed perpendicular to the axis of flight, to minimize the cross sectional area exposed to forward collisions from atomic oxygen and other particles. The "flat" form factor limits the area available for parabolic or large antenna arrays. Accordingly, the antenna for the downlink radio is constructed in the present invention as a flat, phased array antenna.

The NEO vehicle 100 can include an electric propulsion engine 106 to generate thrust by, for example, consuming an ionized fuel to maintain the desired orbit. Although represented as being external to the vehicle bus 102, the engine 106 can be integrated within the bus 102, shielded by one or more panels of the bus 100, and/or dimensioned to extend beyond a surface of the bus 102, in accordance with the present disclosure. One or more stabilization surfaces or panels 108 can be employed, designed to enhance the stability of the NEO vehicle 100, as well as support solar paneling to collect power. The NEO vehicle 100 is defined by a narrow cross section, as exemplified in vehicle bus 102. The bus 102 includes a first or top panel 110, a second or bottom panel 112, and lateral sides 114 and 116. At the nose of the NEO vehicle 100 is a leading edge 104, which is configured with a bevel to slope toward one or both the first or second panel 110, 112.

Figure 2:
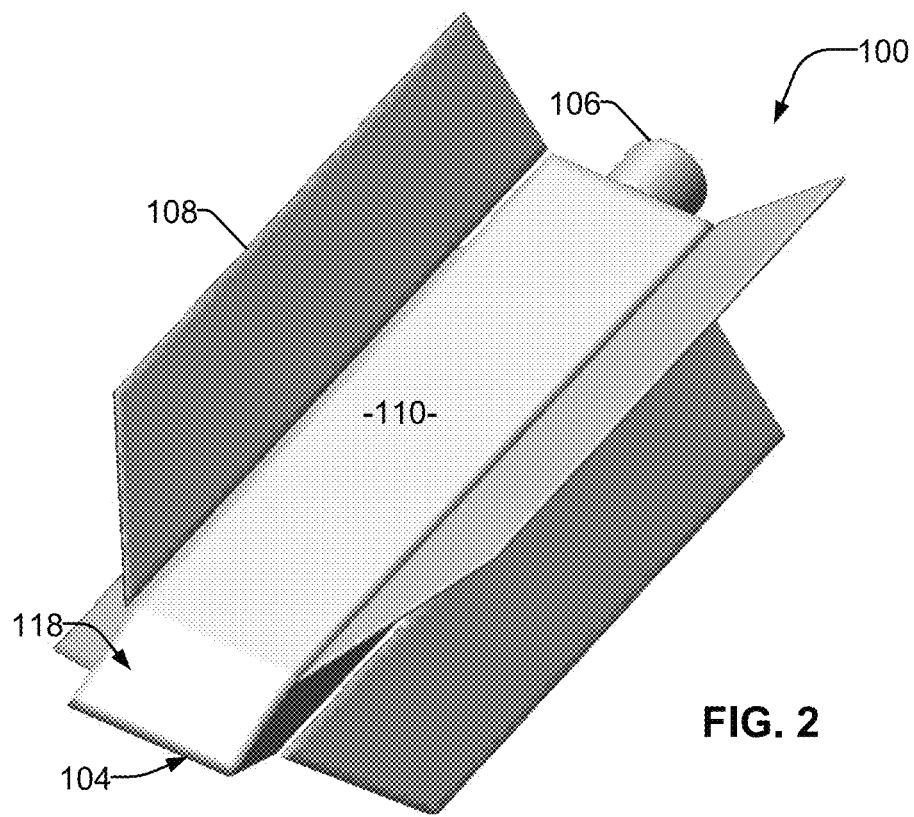
FIG. 2 shows a perspective view of an example low profile satellite used with the present invention.

The example NEO vehicle 100 of FIG. 2 is shown in perspective view, illustrating a bevel 118 sloping from the leading edge 104 to the panel 110. In some examples, the bevel 118 is angled at 20 degrees, and another bevel opposite bevel 118 slopes toward panel 112. In some examples, the angle is greater than or less than 20 degrees. In examples, the bevel 118 slopes at a first angle, whereas the opposite bevel slopes at a second angle different from the first angle. Furthermore, the bevel can slope at a constant angle on a flat surface, or can progress at a varying gradient toward the panels 110, 112. Other variations on the surface of the bevel can also be employed, including ovoid-conical shape, pyramidal shape, etc., with the key feature being that the frontal area is sharply angled along the direction of travel. As described herein, the small cross section of the NEO vehicle 100, as well as the sloping bevel from the leading edge 104, reduces drag on the vehicle 100 from atmospheric particles and aids in maintaining stable orientation in orbit.

Figure 3:
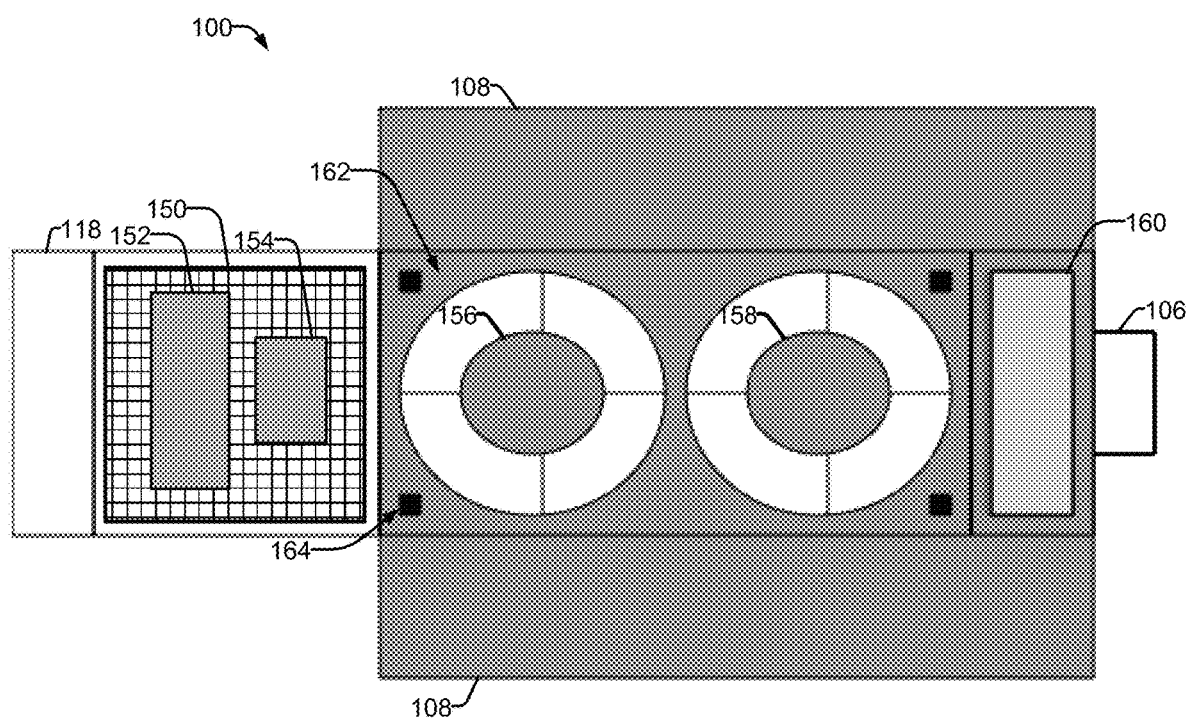
FIG. 3 shows a cross-section of an example low profile satellite illustrating various components for use with the present invention.

FIG. 3 shows a cross-section of an example NEO vehicle 100 illustrating various components, including a radio frequency antenna 150 (e.g., a phased array). A computing platform 152 can include a processor, memory storage, and/or various sensor types, such as attitude control gyroscopes. A battery 154 or other storage system (e.g., capacitor, etc.) can be used to store power collected by solar panels in order to, for example, power the various components and the electronic engine 106 of the NEO vehicle 100.

One or more optical imaging systems/lenses 156,158 are also included (e.g., variable field of view, multispectral imaging, etc.). The lenses 156, 158 are configured to have a thickness sufficient to provide detailed imaging (e.g., a 1 m resolution at NEO altitudes) yet thin enough to fit within the vehicle bus 102, along with the various other components. A folded light path contributes to reduced thickness of an optical assembly, while a radar assembly can be made from an array similar to the radio phased array antenna. Additionally or alternatively, the system can include a mechanical device to control the orientation of the lenses 156, 158 and or the antenna 150 to adjust the focus of the respective system. A baffle 162 can be used to provide stability as well as filtering stray light effects from non-imaged sources, supported by one or more posts 164. Each spacecraft is configured with sufficient area/volume to house one or more imaging systems, such as two camera lenses 156, 158, and one or more baffles 162. In some examples, a camera lens can be a 10 cm thick optical lens system, and a baffle external to the vehicle bus is used.

Many aspects of the spacecraft have equal applicability for systems configured for image capture (e.g., optical data collection) and radar capable spacecraft. In some examples, considerations related to size of the vehicle, weight, drag, power demands, as well as propellant needs, may change based on these and other factors. For example, in some embodiments, the cross-sectional area for an imaging satellite is greater than that for a radar capable satellite (e.g., about 5 cm thick vehicle bus for radar satellite, compared with about 10 cm thick to house the camera optics).

Additional and alternative components may be included in the NEO vehicle 100, such as radar or radio components, sensors, electronics bays for electronics and control circuitry, cooling, navigation, attitude control, and other componentry, depending on the conditions of the orbiting environment (e.g., air particle density), the particular application of the satellite (e.g., optical imaging, thermal imaging, radar imaging, other types of remote earth sensor data collection, telecommunications transceiver, scientific research etc.), for instance. In some examples, the system can include one or more passive and/or active systems to manage thermal changes, due to operation of the components themselves, in response to environmental conditions, etc. The computing platform 152 can be configured to adjust the duty cycle of one or more components, transfer power storage and/or use from a given set of batteries to another, or another suitable measure designed to limit overheating within the NEO vehicle 100.

A fuel storage tank 160 is coupled with the engine 106 to generate thrust to counter the forces on the NEO vehicle 100 from drag, or to position the vehicle in the proper orbit. The present and desired orbit can be compared and any adjustments can be implemented by the computing platform 152. For example, based on sensor data and/or a Global Positioning System (GPS) receiver, the computing platform 152 can determine spatial information indicative of a current altitude of the satellite, an orientation of the satellite relative to a terrestrial surface, and a position of the satellite relative to other satellites. This data can be compared against a desired altitude, orientation or position. If the computing platform 152 determines an adjustment is needed, the ion engine 106 is controlled to generate thrust sufficient to achieve the desired altitude, orientation or position.

The ground stations must be numerous in order to achieve near continuous download of data. At 260 km and assuming that the vehicle antennas have 90 degrees of steering, a vehicle can "see" a ground station within a circle on the earth of about 490 km and for about 60 seconds. During this time, in order to avoid buffering camera data and at 1 meter resolutions, the downlink must transmit at a data rate of 400 Mbps after error coding is factored in. The inventors have determined that the most favorable link parameters to achieve low power consumption while preserving adequate link margins is to use the "Ku" band (e.g., about 11.7-12.7 GHz) with a Quadrature Phase-Shift Keying (QPSK) modulation scheme has a symbol rate of 2 bits/symbol. In some examples, a Binary Phase Shift Keying (BPSK) modulation scheme, and a symbol rate of 1 bit/symbol. In examples, a Frequency-Shift Keying (FSK) modulation scheme can be employed.

In an example employing a QPSK modulation scheme operating in the Ku band, an 870 Mbps data rate can be achieved using 543.75 MHz of bandwidth, consuming approximately 22.5 W of power. A suitable NEO vehicle antenna size is approximately 17.2×17.2 cm, as described with respect to FIG. 4. In such a transmission scheme, a modulation index of approximately 2 bits/symbol and using an error correction coding rate of 0.75, a signal frequency at approximately 12.2 GHz (within the Ku band) with a transmission data rate of 870 Mbps achieves a 652.5 Mbps net data rate.

In an example using a BPSK modulation scheme operating in the Ku band, a 875 Mbps data rate can be achieved using 1094 MHz of bandwidth, consuming approximately 3401 W of power with an antenna size of approximately 17.2×17.2 cm. A modulation index of approximately 1 bit/symbol and using an error correction coding rate of 0.75, a signal frequency at 12.2 GHz with a transmission data rate of 400 Mbps results in a 300 Mbps net data rate.

In accordance with the described transmission scheme, short revisit times can be described above as "near-real time." Traditional LEO and MEO satellites have revisit times of days to weeks, depending on the number of satellites in the constellation. Due to extremely high satellite costs plus high launch costs, satellite constellations are typically limited to a few to a few dozen satellites. Some proposed systems include up to about 100 satellites, promising revisit times down to a day or so.

Near real-time revisit rates offer many advantages and solve many problems inherent in current satellite systems. One example is the "worst case" revisit time as compared to the average revisit time. Most satellites spend about half their orbit in earth's shadow (i.e., night) resulting in poor or useless images. Adding in cloud cover, up to 70% of earth's surface, sand storms and perspective issues (e.g., images taken around noon cast no shadow and are therefore more difficult to interpret) reduce the number of useful images to about one fifth or less of all images taken.

This sampling problem makes it difficult to plan image capture of a certain spot at a certain time. For many implementations, the average time to a useable image may not be as important as the worst case time, which we define as the time between images that meet a certain set of characteristics (e.g., a specific location plus morning or evening, plus no cloud cover, etc.). In this example, getting images of a specific area (e.g., a battlefield or a river flood plain) with a long revisit time constellation can make a worst case scenario push from days into weeks. In this example, a system with a 3-day average revisit time could be overhead at night for several sequential passes, and then encounter cloud cover or dust storms when it is finally overhead with correct lighting. So an average revisit time of 3 days can become a one or two-week worst case scenario, a delay that reduces or even eliminates the value of the images.

Conversely, with an exemplary revisit time of an hour, the current NEO system will generally have a vehicle overhead any spot on earth during daylight hours, many times every day. Furthermore, as clouds and dust storms are not stationary, the probability of having a NEO vehicle 100 overhead during a break in the weather is further increased. Since these statistics are not a purely linear extrapolation of the average revisit times (i.e., they are exponential), worst-case revisit times become much more manageable with the described low revisit time NEO system.

Images are only useful once they are conveyed back to systems on Earth. The NEO vehicle 100 includes a widespread array of receiving stations rather than the normally low number of centralized receiving stations found in use with traditional satellite systems. For example, with three receiving stations (e.g., US, Australia and Europe), a traditional LEO satellite will be within transmission range approximately every 30 minutes (90/3), at best. If the imagery data is available with an inherent delay of a week due to the long revisit time described above, a further 30 minute delay is relatively small. In the event that a satellite is not in communication with a ground based station at the time of imaging, the satellite imaging and processing components can buffer the image data, and transmit to the next available ground station (e.g., when imaging an ocean or uninhabitable area).

However, for the current NEO satellite system, with average revisit rates of an hour or less, down to minutes or seconds in some examples, such a delay would be a large percentage of the goal. Therefore, data can be downloaded from the NEO vehicles to a large network of low-cost earth receiving stations to enable low-latency data downloads, ideally with latency from time of taking to time of receiving on the order of minutes to tens of minutes. In some examples, new image data is captured at a very fast rate. To ensure proper downloading of the acquired data, the images should be transmitted at the rate they are created, or faster. If the image data cannot be downloaded at a suitable rate, then data and/or images may be buffered or discarded. Thus, to ensure a complete image is downloaded and/or created, the imaging system should be within range of a ground station, with a reasonable communications link, during an imaging event.

In one exemplary solution, receiving stations may be mounted atop commercial cellular base stations, of which there are about 300,000 in the US alone. Most such base stations are designed to support cellular communications radially outward. Therefore, an upwardly pointed radiation pattern can use the open area at the top of the base station tower or on top of a suitable structure (e.g., a building, etc.), directing and receiving all energy to/from an orbiting NEO satellite and away from any interference with the cellular signals.

In order to download sufficient data during an overpass of a single NEO satellite and to meet the size, mass and cost targets of the NEO satellite, a simple antenna with a relatively wide beam will enable a relatively large footprint on earth's surface. For example, a beam with full width half max (FWHM) beam angle of 45° from 100 km altitude would have a circular footprint about 200 km in diameter. Assuming the vehicle's orbital velocity is about 7.8 km/s, a useable receive time of about 26 seconds would result. A narrower beam would reduce this time while a wider beam would increase it.

Thus, in some examples, a phased array antenna is provided on both the NEO satellite and the ground based station. The beamwidths for the antennas are small (e.g., 6.4 and 3.2 degrees). This narrow beamwidth allows the antennas to achieve a high gain (e.g., 28.9 and 34.9 dB), which serves to reduce power consumption. Phased array technology has historically been used in military and space applications, but recent advances in silicon technology are enabling highly integrated, cost effective solutions to be developed for next generation cell phone communications systems in commercial markets.

These disclosed narrow beamwidths, combined with speed and low altitude, allow both the ground station and spacecraft antennas to be steered as needed to provide continual communications coverage (e.g., steered on a frequent or continual basis). In conventional systems, the gain of the phased array antenna is reduced as the scan angle increases, making it difficult to scan very far with patch antennas. To overcome the shortcomings in the conventional systems, the antennas described herein are designed with a scan angle of about +/−45 degrees. Additionally, the antenna gain goes up as the beam width narrows. The increased gain, and thus improved link budget and received signal level, can enable a higher order of signal modulation, and thus a higher data transfer rate.

In order to ensure low-latency downloads, downloads may occur when a vehicle is passing over long stretches of ocean or other "dead zones", of which the oceans are the largest. In addition to ensuring availability of sufficient receiving stations on islands, receivers may also be placed on ships or buoys to receive the images, which can then be transmitted to processing centers via traditional high capacity satellites or fiber links.

In addition, NEO vehicles may include a vehicle-to-vehicle communication system, such as with point-to-point laser systems. Using such an inter-vehicle link would enable very high-speed data rate transfer between vehicles, enabling downloads to be handled by a vehicle other than the one collecting an image. Adding this flexibility to the system has several benefits, including filling dead-zone gaps, backup capability if receivers are unavailable, and backup capability if a downlink transmitter on a NEO vehicle becomes disabled.

As the altitude increases, so does the power requirements for the radio system; however, the drag on the satellite decreases exponentially reducing the thrust requirements to overcome orbital decay, and the destructive effects of high velocity impacts with atomic scale atmospheric particles, such as Oxygen, decrease. In the present invention, it has been determined that an altitude of 260 km allows for about 1 meter resolution of the earth's surface by optical imagers with a power requirement for the imager and radio combination that can be satisfied in a small, low drag profile vehicle that can be kept in orbit for several years, as disclosed in the related application entitled "System For Producing Remote Sensing Data From Near Earth Orbit." Unique to this system, the communications scheme only requires one ground station every 420 km or so for a total of about 60 to 100 ground stations to cover the United States. Additionally or alternatively, up to about 850 ground stations can cover the Earth's land mass, and up to about 1,100 ground stations can cover the Earth's surface (e.g., including water borne or airborne antennas, etc.). At 260 km orbital altitude, the satellite will be able to "see" a ground station for about 63 seconds before it must establish a new link with the next ground station on its orbital path.

Figure 4:
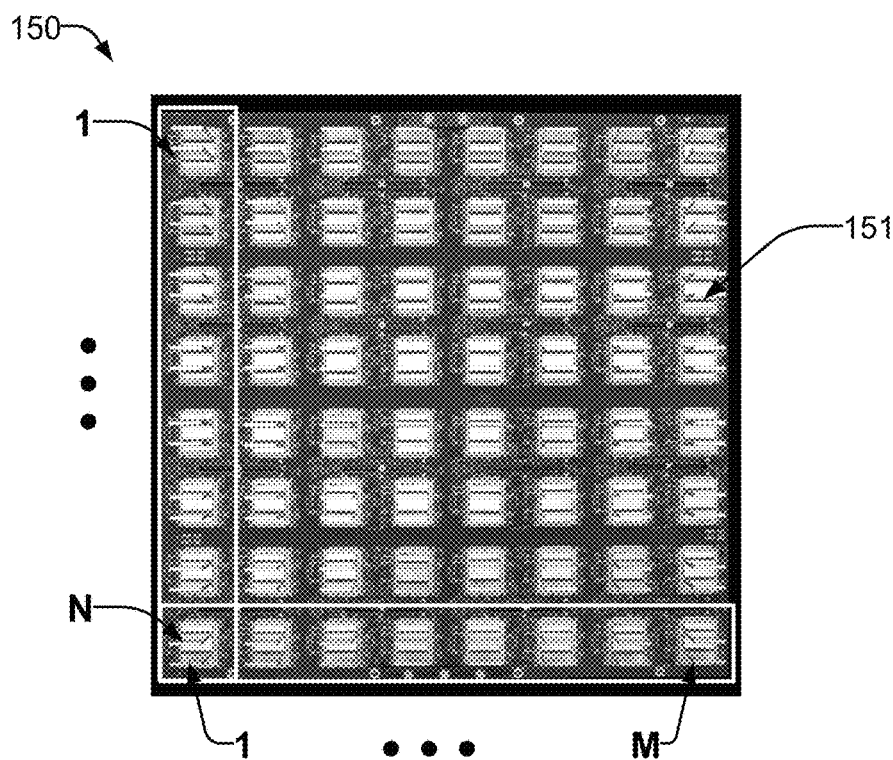
FIG. 4 shows an example antenna design for a low cost earth station for use with the present invention.

One component of the communications system is a planar antenna. FIG. 4 shows an exemplary design for such an array. For example, the phased array antenna 150 includes a plurality of elements 151 designed to communicate with a ground based transponder. The elements 151 are arranged in a grid, with M number of elements 151 along they horizontal axis times N number of elements 151 along the vertical axis to define the phased antenna array. Although illustrated as an 8×8 element phased array antenna, any number of MxN elements 151 can be used to facilitate communications. For instance, a 16×16 element phase array antenna can be implemented in a flat, square package in the NEO vehicle 100 (see, e.g., FIG. 3). This configuration has the advantage of a low profile integration into the satellite, as well as being steerable to "point" the downlink at the earth station improving link performance. The beamwidth is set for 6.4 degrees, and the array size is 17.1 cm×17.1 cm, small enough to fit within the "Cubesat" unit form factor of 2 U (20 cm) width on a vehicle having a 10 cm maximum vertical thickness (1 U) while still carrying the image package, engine, electronics, and solar panels.

To reduce the power requirements for the link, the ground station utilizes a larger antenna that is also a phased array, in the present invention the array is 28×28 elements with an overall size of 34.5×34.5 cm. This larger size has a higher gain than the antenna on the vehicle, which allows the satellite to transmit at a lower power. Like the antenna on the satellite, it is also steerable so that the maximum antenna gain can be "pointed" at the satellite.

In the present system, it is contemplated that the satellite will be "in view" of a ground station for about 60 seconds. During this window, the ground station must establish a link with the satellite, download the image data for at least a 60 second period of images, download telemetry from the satellite regarding operational status, and upload any commands to the satellite. The ground station also forwards the downloaded data and telemetry to a terrestrial wide area network for collection and processing at the satellite constellation control facility.

Figure 5:
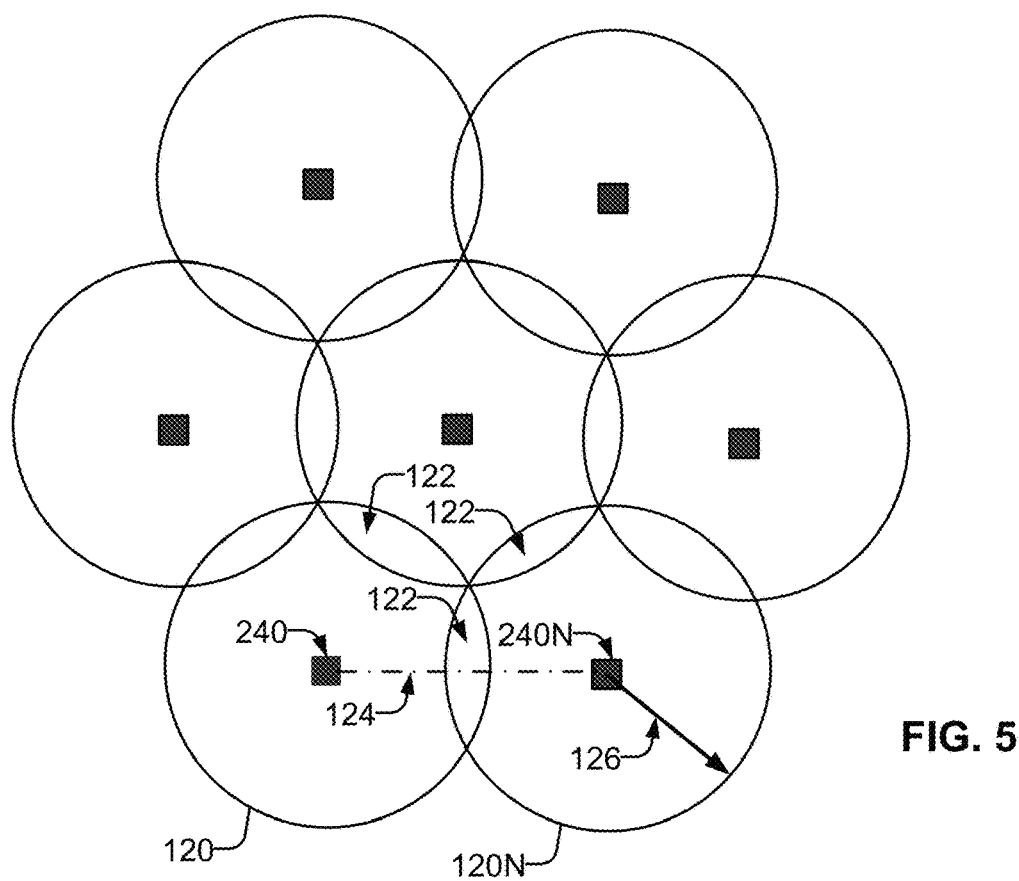
FIG. 5 shows an example earth station spacing plan for use with the present invention.

One feature of the present system is a design plan for locating ground based stations in such a manner as to ensure continuous coverage. In the example of FIG. 5, plural ground based stations 240-240N can be separated by a distance 124 to ensure the range 120-120N of adjacent station antennas overlap 122. As shown, each ground based station 240-240N has an approximate range 126, beyond which the associated antenna is unable to receive data from a passing NEO vehicle 100. Thus, as each NEO vehicle 100 transmits information to a ground based station 240-240N during flight, when the antenna array associated with ground based station 240 reaches its limit, the range 120N from the antenna array associated with adjacent ground based station 240N is configured to "hand off" the information from the NEO vehicle 100. Such signal transfer is described with respect to FIG. 6.

Figure 6:
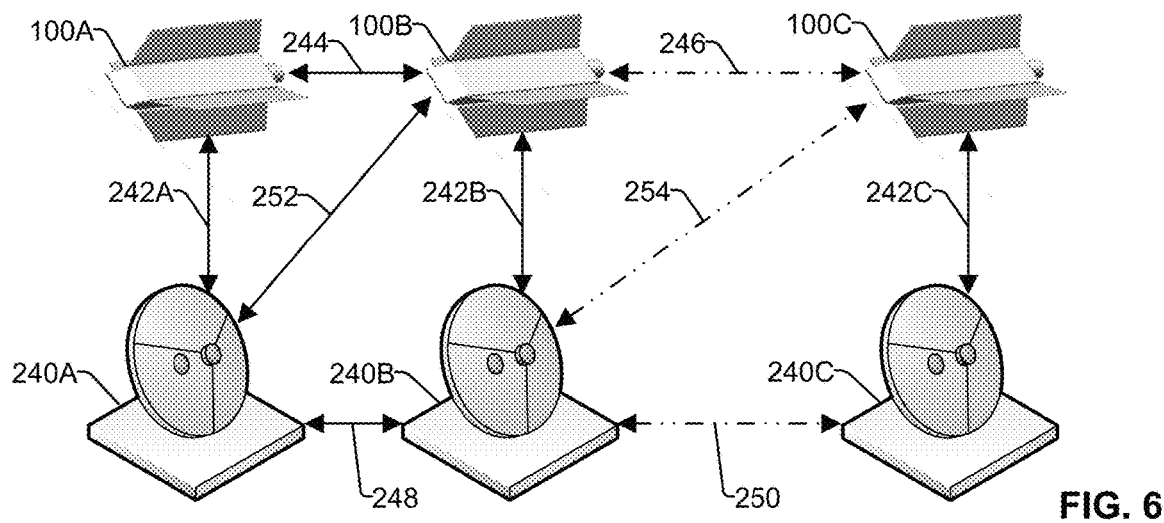
FIG. 6 shows an example of satellites interacting with plural ground stations for use with the present invention.

FIG. 6 shows an example of satellites interacting with plural ground stations in accordance with aspects of this disclosure. As shown, a plurality of satellites 100A-100C are in a near earth orbit, as described herein. A vehicle-to-vehicle laser communication system may be included to improve data download rates, flexibility and reliability. Each satellite 100A-100C is equipped with communications systems to communicate with other satellites (e.g., laser communications, radio communications, etc.). In the example of 90 satellites in an orbital plane at about 1 minute intervals, distance between satellites will be approximately 450 km. Since the horizon from 160 km altitude is more than 1,000 km away, a laser communications system is capable of providing a direct link to multiple satellites in the same orbital plane. Since the vehicles will be oriented along the orbital plane in order to minimize drag, the control system for the inter-vehicle laser communications may be simple, for example, including possibly a fixed orientation.

For example, satellite 100B can send and receive information to satellite 100A via link 244 and with satellite 100C via link 246. In a high volume constellation with close spacing at low altitudes, line of sight laser communications to neighbor vehicles will be effective. In the example of 90 satellites in an orbital plane at 1-minute intervals, distance between satellites will be approximately 450 km. Since the horizon from 160 km altitude is more than 1,000 km away, a laser communications system is capable of providing a direct link to multiple satellites in the same orbital plane with minimal atmospheric diffusion effects at low power. Since the vehicles will be oriented along the orbital plane in order to minimize drag and their relative positions change very slowly, the pointing system for the inter-vehicle laser communications may be relatively simple. Using such an inter-vehicle link would enable very high-speed data rate transfer between vehicles, enabling downloads to be handled by a vehicle other than the one collecting an image. Adding this flexibility to the system has several benefits, including filling dead-zone gaps, backup capability if receivers are unavailable, and backup capability if a downlink transmitter on a NEO vehicle becomes disabled.

As shown in FIG. 6, each satellite 100A-100C is configured to send and receive information to and from ground based systems 240A-240C. Each ground based system 240A-240C is configured to communicate with another ground based system via communication links 248, 250. For example, communications links 248 and 250 can be laser based, radio frequency transmissions, wired connections, or a combination thereof. The communication links may utilize dynamic beam shapes to maximize data download during each pass of satellites.

The system further includes a distributed earth receiver system relying on a large number of receivers each downloading data during a satellite overpass. For instance, ground based systems 240A-240C are configured to communicate with satellites 100A-100C to send and receive information via communication links 242A-242C. Additionally or alternatively, a ground based system can communicate with more than one satellite, or vice versa. As shown in FIG. 6, ground based system 240A is communicating with satellite 100A via communications link 242A, and is also configured to communicate with satellite 1008 via link 252. In examples, ground based station 240A can anticipate the arrival of satellite 1008 and adjust one or more antennas to facilitate data transfer. The position of satellites within the orbit can be determined based on information stored in a database and available to each ground station and/or satellite. The database can be updated in response to data received through earlier ground based station communications to improve estimates of a given satellite's location, speed and/or other operational parameters. Moreover, communication between the ground based station 240A and satellites 100A and 1008 can occur simultaneously or in succession.

Although the orbits are numerous, they are precisely known. Each ground station is connected to a satellite ephemeris server that contains data on when, where on the horizon, and on what trajectory the next satellite will appear in view of any given ground station. Each ground station then, aims its antenna beam at the location in the sky where the satellite is next expected to appear. In the same way, each satellite stores its own corresponding table of ground stations in order of appearance, with instructions for where on the surface of the earth to aim its antenna to track the next ground station. In some examples, the information regarding location of the ground station is transmitted to each satellite during a communication event. Additionally or alternatively, the location data includes information regarding the frequency, power, Doppler shift, etc., associated with a particular satellite. Access to such transmission characteristics further enhances the ability to track satellite movement, and allows a ground satellite to anticipate the arrival of a satellite and prepare the antenna for a particular transmission.

For example, both the ground station and the spacecraft can estimate the Doppler shift and compensate for it. Such anticipation and compensation facilitates initial signal acquisition. For instance, if the receiving system knows to shift up by 100 kHz during signal acquisition, the signal is acquired more efficiently and effectively. Moreover, the Doppler shift will change continuously as the spacecraft moves through the ground station coverage area, and the frequency shift will be continuously tracked and corrected based on the spacecraft movement, speed, location, distance from the ground station, etc.

The electrically steerable nature of the antennas coupled with the fact that the location of both the ground station and satellite are known allows for fast and efficient link establishment as the satellite moves over the earth. The ground station table on the satellite is updated periodically by the reverse link from the earth station. It is noted that the uplink requirements are substantially less demanding than the downlink since a very low data rate uplink, on the order of a few thousand bits per second, is sufficient to keep the satellites onboard ground station table up to date. In the event that the table fails, the satellite reverts to an acquisition mode where the earth under the flight path is scanned for an acquisition signal from a ground station; when a signal is acquired, the satellite's tables are refreshed by the ground station.

In some examples, a single ground station communicates with multiple satellites. For instance, the satellites can transmit information in a unique frequency and/or with varying modulation schemes. To communicate with satellites in different orbital positions, the ground station may have multiple antennas (e.g., steerable antenna) configured to track the movement of a satellite and/or the transmission characteristics of the satellite.

In some examples, the ground station is portable. For instance, the ground station can be mounted on a vehicle (e.g., a wheeled vehicle, an airborne vehicle, a watercraft, etc.) such that a communications link can be provided in an area that does not maintain a permanent receiver. Such a ground station can be deployed in disaster areas, conflict areas, and/or areas were imaging may be available for short periods. Portable ground stations can communicate with other ground based stations via cellular data links and/or temporary communications cabling, as the environment and/or situation allows.

Figure 7:
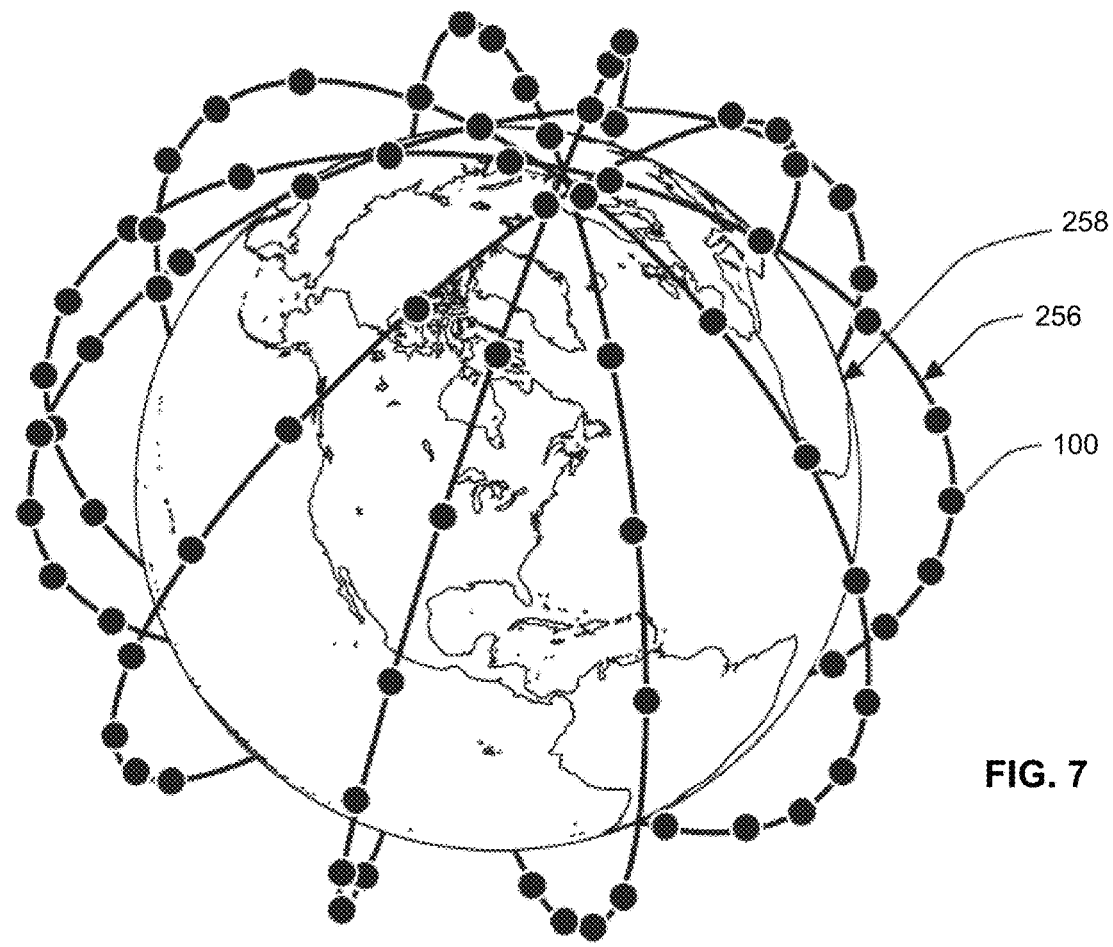
FIG. 7 shows an example of satellite necklaces for use with the present invention.
Figure 8:
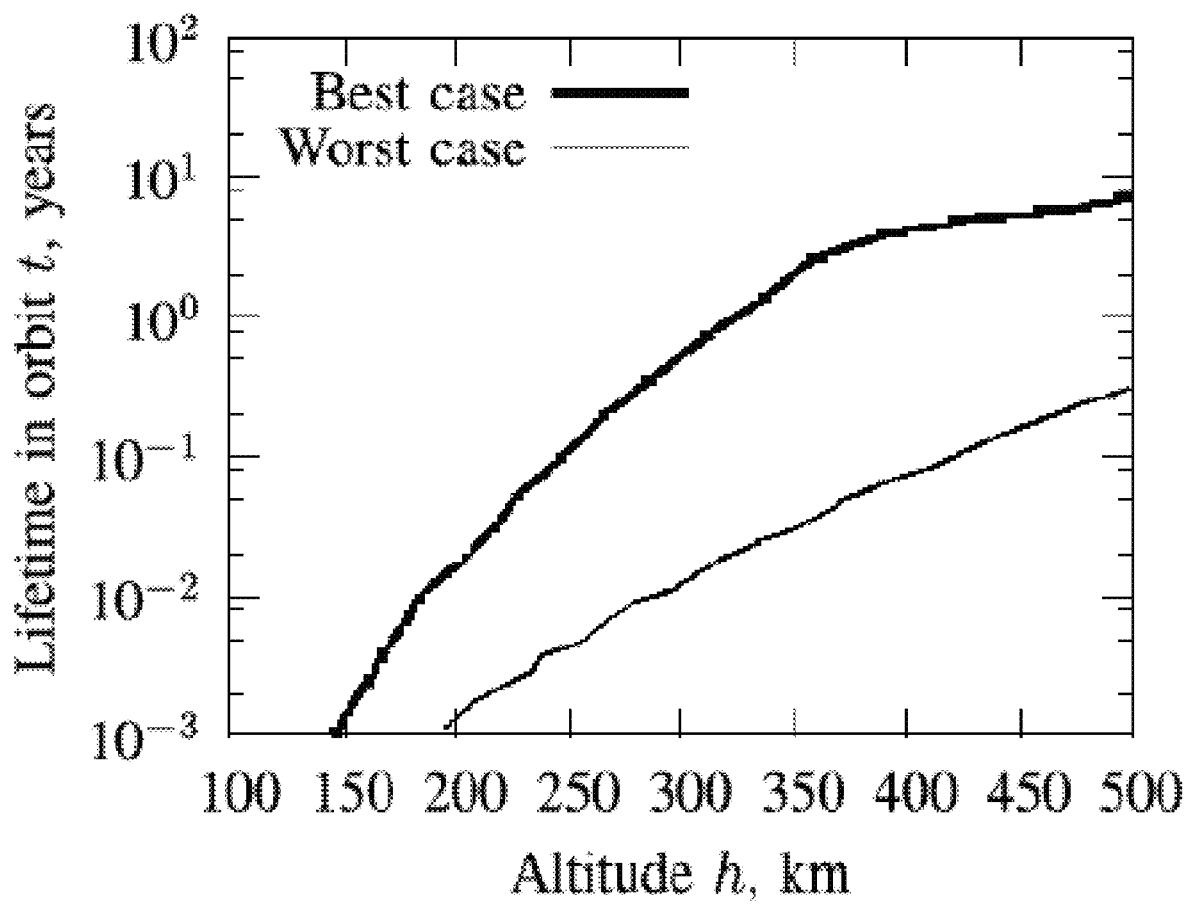
FIG. 8 graphically illustrates a best and worst case curve for expected lifetime of orbiting vehicles as a function of altitude.

In the example of FIG. 7, one or more NEO vehicles 100 can maintain an orbit 256 around the Earth 258, in accordance with the present disclosure. In one example, 90 satellites per necklace can be used, however more or fewer satellites per necklace may be appropriate for a given application. For example, 45 satellites per necklace would space the vehicles at 2-minute intervals, while 180 would space vehicles at 30-second intervals. As a person of ordinary skill will understand, the earth will rotate during the interval between arrivals of two sequential NEOs, with that distance determined by the time separation between the satellites. Different spacing distances may impact other subsystem designs such as optical imaging and radio links, but the concept remains that a NEO satellite system can provide relatively high rates of coverage. Although FIG. 6 shows three satellites in succession, any number of satellites into the tens of thousands can be employed in a satellite constellation, and can be aligned in a single direction of travel in a single orbit, or may be traveling at angles with respect to each other, and occupy multiple orbits (see, e.g., FIG. 7).

A communications system for use with a large constellation of imaging satellites in near earth orbits has been described.

The system includes a large number of the low-cost, low-mass, low altitude NEO vehicles, thereby enabling revisit times substantially faster than any previous satellite system. The NEO vehicles spend virtually all of their orbit at the low altitude, high atmospheric density conditions that have heretofore been virtually impossible to consider. Short revisit times at low altitudes enable near-real time imaging at high resolution and low cost. The system further includes a distributed earth receiver system relying on a large number of receivers each downloading data during a satellite overpass. The communication link may utilize optimized beam shapes to maximize data download during each pass. A vehicle-to-vehicle laser communication system may be included to improve data download rates, flexibility and reliability. By operating at such altitudes, the orbital mechanics have no impact on the space junk issues of traditional LEO orbits and the system is self-cleaning in that any space junk or disabled craft will quickly de-orbit.

What is claimed is:

1. A plurality of ground stations, each ground station of the plurality of ground stations comprising:
one or more electronically steerable phased array antennae configured to:
transmit and receive data,
communicate with one or more satellites operating at 100 km to 400 km in altitude, and
obtain satellite data comprising satellite location and trajectory information; and
a processor configured to:
use the obtained satellite data to steer each of the one or more electronically steerable phased array antennae to an expected location of the one or more satellites to establish a communications link with the one or more satellites, and
perform a hand-off of the communications link of the one or more satellites from a first ground station at a predetermined first location to a second ground station at a predetermined second location,
wherein the one or more satellites occupies a region of overlap within a transmission range of the first ground station and a transmission range of the second ground station during the hand-off.

2. The plurality of ground stations of claim 1, wherein the one or more electronically steerable phased array antennae provide continuous coverage to the one or more satellites.

3. The plurality of ground stations of claim 1, further configured to perform a second hand-off from the first or second ground station to a third ground station of the plurality of ground stations.

4. The plurality of ground stations of claim 3, wherein the one or more satellites occupy a second region of overlap within a transmission range of at least two of the first, second, or third ground stations during the hand-off.

5. The plurality of ground stations of claim 1, wherein communication with one or more satellites is performed at a data rate of 300 Mbps or greater.

6. The plurality of ground stations of claim 1, wherein the plurality of ground stations are arranged to ensure the transmission range of the first ground station overlaps with the transmission range of the second ground station.

7. The plurality of ground stations of claim 1, wherein the plurality of ground stations operate in a Ku frequency band.

8. The plurality of ground stations of claim 1, wherein at least one of the first ground station and the second ground station is co-located with a cellular base station.

9. The plurality of ground stations of claim 1, wherein the plurality of ground stations is further configured to receive telemetry information from the one or more satellites and upload information to the one or more satellites.

10. The plurality of ground stations of claim 9, wherein the information uploaded to the one or more satellites comprises hand-off information.

11. The plurality of ground stations of claim 1, wherein the plurality of ground stations is further configured to communicate with a terrestrial wide area network.

12. The plurality of ground stations of claim 1, wherein the plurality of ground stations is further configured to communicate with a server that includes the satellite data.

13. The plurality of ground stations of claim 1, wherein the plurality of ground stations are separated by a distance to ensure adjacent station antennas have an overlapping range.

14. The plurality of ground stations of claim 1, wherein the plurality of ground stations are further configured to anticipate an arrival of the one or more satellites.

15. The plurality of ground stations of claim 14, wherein the plurality of ground stations are further configured to adjust one or more antennae to facilitate data transfer.

16. A system comprising:
one or more satellites; and
a plurality of ground stations, each ground station comprising one or more electronically steerable phased array antennae configured to transmit and receive data and configured to:
communicate with the one or more satellites operating at 100 km to 400 km in altitude, and
obtain satellite data comprising satellite location and trajectory information; and
a processor configured to:
steer each of the one or more electronically steerable phased array antennae to an expected location of the one or more satellites; and
perform a hand-off of a communications link of the one or more satellites from a first ground station of the plurality of ground stations at a predetermined first location to a second ground station of the plurality of ground stations at a predetermined second location, wherein the one or more satellites occupy a region of overlap within a transmission range of the first ground station and a transmission range of the second ground station during the hand-off.

17. The system of claim 16, further comprising a database including historical satellite location, speed, or other operational parameters.

18. The system of claim 16, wherein the one or more satellites are configured to transmit data or images.

19. A method for handing off a communications link of a satellite between a first ground station and a second ground station, the method comprising:
each of the first ground station and the second ground station comprising one or more electronically steerable phased array antennae and communicating via the one or more electronically steerable phased array antennae with one or more satellites operating at 100 km to 400 km in altitude;
obtaining satellite data comprising satellite location and trajectory information;
using the obtained satellite data to steer each of the one or more electronically steerable phased array antennae to an expected location of the one or more satellites; and
performing a hand-off of the communications link of the one or more satellites from the first ground station at a predetermined first location to the second ground station at a predetermined second location,
wherein the one or more satellites occupy a region of overlap within a transmission range of the first ground station and a transmission range of the second ground station during the hand-off.

* * * * *